June 21, 1932. L. H. CHURCH 1,864,339
PIPE COUPLER
Filed April 16, 1929
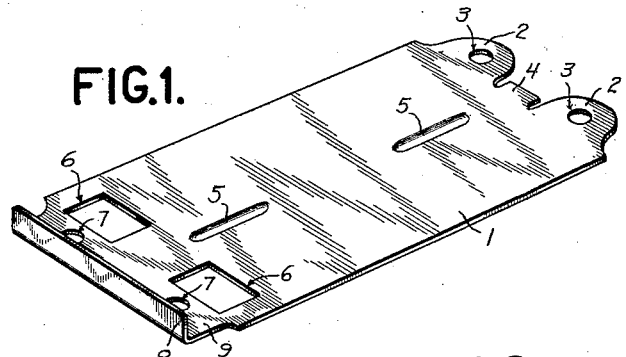
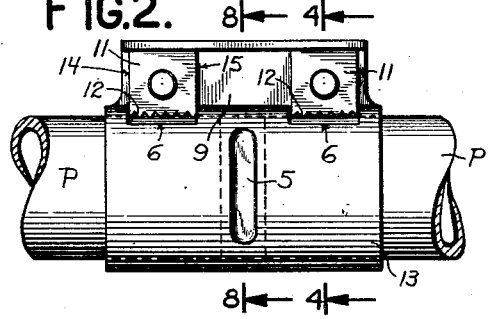
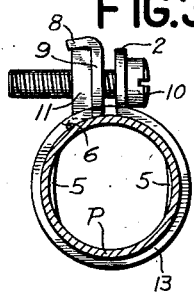
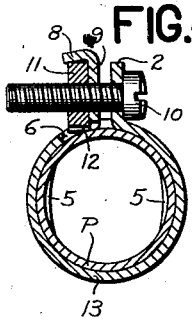
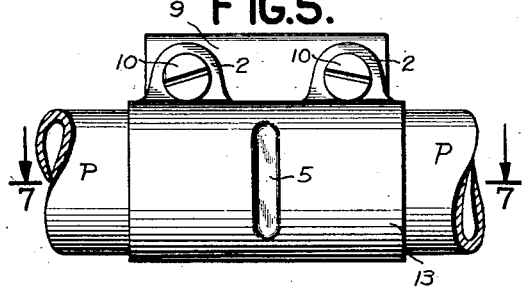
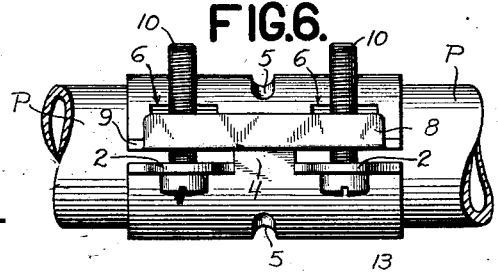
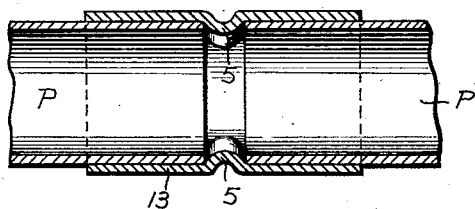
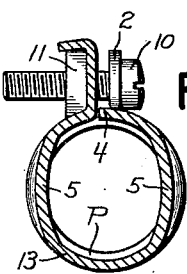
Inventor
LEWIS H. CHURCH
By his Attorneys
Bohleber & Ledbetter Patented June 21, 1932

1,864,339

UNITED STATES PATENT OFFICE

LEWIS H. CHURCH, OF WESTFIELD, NEW JERSEY, ASSIGNOR TO THE THOMAS & BETTS CO., OF ELIZABETH, NEW JERSEY, A CORPORATION OF NEW JERSEY

PIPE COUPLER

Application filed April 16, 1929. Serial No. 355,595.

This invention relates to pipe couplers which are adapted to firmly secure pipes together such for example as are used in electrical wiring, without the use of threaded members or without the necessity of having the ends of the pipe threaded. A coupler of this sort must grip the two pipes firmly in order to prevent separation between the pipes and the coupler and my form of construction secures the required grip without the use of threads on the pipe or coupler although the ends of the pipes may be threaded if desired.

An object of the invention is to produce a coupler which may be manufactured from sheet metal by punching a blank therefrom and bending the blank into the form in which it will be used for a pipe coupler.

Another object is to produce a pipe coupler which can be quickly applied to couple together two pipes having threaded or unthreaded ends and which when tightened upon the pipes securely and positively binds them within the coupler.

The invention may be more clearly understood from the following description and the drawing showing the preferred embodiment of my invention in which:

Figure 1 is a perspective view of the coupler blank in the form in which it is punched from the sheet material.

Figure 2 is a plan view of the coupler assembly in which the ends of two pipes are coupled together and the assembly being viewed from the side showing the means by which the positive gripping of the pipes is secured.

Figure 3 is a side view of Figure 2 showing the action of the gripping means from the side.

Figure 4 is a section on the line 4—4 of Figure 2 through the coupler pipe and gripping means and showing in particular the manner in which the pipes are securely gripped within the coupler.

Figure 5 shows the coupler in plan view from the reverse side of Figure 2.

Figure 6 is an elevation of the coupler showing the holding means to prevent turning of the pipe gripping means.

Figure 7 is a section on line 7—7 of Figure 5 showing in detail the centering means for the pipes and the manner in which the pipe ends are centered within the coupler.

Figure 8 is a section of the coupler on line 8—8 of Figure 2 through the centering means.

The coupler is so constructed that it may be quickly applied to couple the ends of pipes together which are unthreaded although the device is also suited to be applied to pipes having threaded ends. The coupler also has a gripping means which provides a substantial gripping edge or surface directly on the pipe resulting in a positive gripping of the pipes within the coupler. This gripping means may have teeth to bite into the pipe surface to more securely grip the pipe in the coupler and also to bite through any insulating coating such as paint, grease and dirt upon the surface of the pipe and assure a good electrical contact between the pipe and the coupler so that the entire pipe system may be well grounded electrically.

Referring now to Figure 1 in which the coupler blank 1 is shown as it is punched from sheet metal. The blank is of such length that it will completely encircle the pipes to be coupled together and in addition provide certain projections at each end of the encircling portion to be described. A pair of ears 2 are provided at one end of the blank and each ear has a screw hole 3. A projection 4 which is shorter in length than the ears 2 extends from the blank end and is positioned between the two ears. Centrally of the longitudinal edges of the blank 1 and intermediate of the ends are a pair of ridges 5 formed in the blank surface by punching depressions in the surface on the reverse side. Although two such ridges are shown it is clear that more may be provided or it may be a continuous ridge for the entire length of the blank. If two such ridges are raised as shown in the drawing, the ridges are spaced apart a distance equal to half the circumference of the pipe to be coupled so that when the blank is bent into its circular form the ridges are diametrically opposite each other.

A pair of rectangular or square openings or windows 6 are punched through the blank adjacent the end opposite from the ears 2. The extension 9 of the blank projects beyond the windows in which the screw holes 7 are provided adjacent to each window. The end of the blank adjacent the openings 6 extends somewhat beyond the screw holes 7 so that the extreme end may be bent at right angles to form the lip 8.

The coupler is produced by bending the blank into the form shown in Figures 2 through 8 in which the greater part of the blank becomes the circular shell 13. The ridges 5 are now diametrically opposite each other and project into the cylindrical space within the shell to form centering stops or ridges. The shell is of such diameter that the pipes to be coupled together may be freely inserted into the open ends until they abut the centering ridges 5. The ears 2 project substantially at right angles to the circular body and are separated by a space or gap from the extension 9 which also projects substantially at right angles from the shell and practically parallel to the ears 2 and the holes 3 in the ears 2 are in alignment with the holes 7 in the extension 9 for the insertion of screws or bolts therethrough as operating means to grip the pipes within the coupler.

It will be seen from Figure 7 that the ends of the pipes P abut the centering ridges 5 which leaves a space between the ends of the pipes or separates the ends a distance depending upon the width of the ridges. The shell 13 of the coupler further is not a complete circle but has the gap shown in Figure 6 between the extension 9 and the ears 2 which would leave an uncovered opening into the pipes through this gap and through the separated pipe ends and expose the electrical wires carried therein which would be objectionable. For this reason the projection 4 is provided betwen the ears 2 which completes the circle or cylindrical shell at the point between the ears 2 so that this opening is completely covered and therefore no part of the wires running through the pipe are exposed at any point.

The coupler secures the pipes P within the shell 13 by means of the screws 10 and the nuts 11 in a manner to be described. The windows or openings 6 in the shell 13 are adjacent the extension 9 as shown in Figure 4. Screws 10 are inserted through the holes 3 and 7 provided therefor through the ears 2 and the extension 9, and the square nuts 11 threaded thereon. One edge of each nut extends through its respective window 6 and engages the pipe and tightening of the screw draws the nut down in a powerful wedging action against the pipe to bind the pipe in the coupler between the shell 13 and the edge of the nut 11. The lip 8 forms a channel having a width equal to the shortest width of the nut so that it slips freely into the channel and is held against turning. In order to tighten the coupler to bind a pipe therein, requires a screw driver only and the workman does not need to hold the nut which is held against turning by the sides of the channel receiving the nut formed by the lip 8 and the pipe itself which is exposed through the window 6. The sides of the opening or window also may aid in preventing turning of the nut while the screw is being turned to draw the nut into binding action against the pipe.

The nuts 11 are preferably square since nuts of this form afford a wider gripping edge to bind the pipe in the coupler but they may be octagonal or any other form although for best results at least one straight gripping edge should be provided. With one straight edge on the nut, the lip 8 may be dispensed with and the edge contacting with the pipe wall will prevent the nut from turning, and the side edges of the windows 6 will assist in preventing the nut from turning while the screw is being turned. Although the lip 8 is not an essential feature of my invention it materially aids the workman in assembling the coupler to couple two pipes together and for that reason is my preferred construction. When the lip 8 is used it may be turned up to grip some other edge of the nut for instance the edge 14 or the edge 15 which are at right angles to the coupler axis. The preferred form however is that shown in which a channel is formed for the reception of the nut and in which the lip is parallel to the axis of the coupler and pipes.

Frequently the pipes P are painted or covered with rust forming an insulating layer and preventing electrical connection through the coupler to the pipe. The pipes in such case are not grounded and in order to assure a good electrical connection through the coupler, the gripping edge of the nut is serrated or provided with sharp teeth which bite through the insulating layer and give a good electrical contact. In addition the teeth give a more secure and tight grip on the pipe. Also if the pipe ends should be threaded the serrations on the nut will engage the screw threads and give an exceedingly secure coupling.

In coupling two pipes together, the ends of the pipes are inserted through the ends of the coupler until they abut the centering ridge or stop 5. The nuts are then placed in the channel provided by the upturned lip 8 and the screw 10 is inserted through the screw holes 3 and 7 and threaded through the nut. The side of the nut having the gripping teeth 12 is positioned in the opening 6 so that upon tightening of the screw 10, these teeth grip into the pipe surface and securely bind the pipes in the coupler and also establish a good electrical contact.

The pipe coupler described and shown herein provides two identical attaching means by which the ends of two pipes are coupled together. Now it may be desirable to attach a pipe end to some other structure other than the end of another pipe in which case the pipe coupler attaching means described herein is provided for the pipe end and some other attaching means may be substituted for the other pipe attaching means if desired. It is clear that the pipe coupling or attaching means is suitable for any cylindrical member or stud and is not limited to attaching a pipe therein.

There are many modifications which will occur to those skilled in the art which may be made in the construction shown herein such as providing a plurality of windows for a plurality of nuts and screws to grip each pipe. The positioning of the lip 8 which has been discussed may be changed to engage any edge of the nut or it may be so constructed that it engages two or three edges of each nut. The centering ridges or stops may be dispensed with or the ridge may be continuous about the entire inner circumference of the shell. The many variations possible in the construction of the coupler is contemplated by this invention.

What I claim is:—

1. A pipe coupler comprising a cylindrical member having open ends for the insertion of the ends of the pipes to be coupled together, openings in the cylindrical member, spaced screw supporting means projecting from the cylinder and positioned upon one side of the openings, a screw supported by the spaced screw supporting means, and a nut on each screw having an edge projecting through the opening in the cylindrical member and contacting with the pipe to clamp it in the coupler.

2. A pipe coupler comprising a cylindrical member having open ends for the insertion of the ends of the pipes to be coupled together, openings in the cylindrical member, a screw adjacent each opening and supported by the cylindrical member, a nut on each screw having an edge projecting through the opening in the cylindrical member and contacting with the pipe to clamp it in the coupler and means engaging at least one other edge of the nut to prevent its turning.

3. A pipe coupler comprising a longitudinally split cylindrical member, openings in the cylindrical member adjacent the split, members for each opening projecting from the cylindrical member on each side of the split, passages through the members, screws passing through the passages, and a nut for each screw having an edge projecting through its adjacent opening in the cylindrical member and engaging the pipe to clamp the pipe within the coupler.

4. A pipe coupler comprising a longitudinally split cylindrical member, openings in the cylindrical member adjacent the split, members projecting from the cylindrical member on either side of the split, passages therethrough adjacent each opening in the cylindrical member, screws passing through the passages, and a nut for each screw having an edge projecting through its adjacent opening in the cylindrical member and engaging the pipe to clamp the pipe within the coupler.

5. A pipe coupler comprising a longitudinally split shell, openings in the shell adjacent the split, members projecting from the shell on either side of the split, passages therethrough adjacent each opening in the shell, screws passing through the passages, a nut for each screw having an edge projecting through its adjacent opening in the shell and engaging the pipe to clamp the pipe within the coupler and a lip projecting from one of the projecting members to engage an edge of each nut to prevent its turning.

6. A pipe coupler comprising a longitudinally split shell, openings in the shell adjacent the split, members for each opening projecting from the shell on each side of the split, passages through the members, screws passing through the passages, a nut for each screw having an edge projecting through an opening in the shell and engaging the pipe to clamp the pipe within the coupler, and serrations upon the edge of the nut engaging the pipe.

7. A pipe coupler comprising a longitudinally split cylindrical member, openings in the cylindrical member adjacent the split, members for each opening projecting from the cylindrical member on each side of the split, means to clamp the pipes through the openings, and means at the split in the cylindrical member and intermediate the ends to close the split.

8. A pipe coupler comprising a longitudinally split shell, windows in the shell adjacent the split, an ear adjacent each window projecting from the shell at the split, an extension projecting from the shell at the other edge of the split, screw holes through each ear and the extension, a screw passing through each hole, a nut on each screw having a gripping edge projecting through a window and engaging a pipe within the coupler, and a lip on the end of the extension and projecting at right angles thereto to engage the edge of each nut opposite to the gripping edge of the nut.

9. A pipe coupler comprising a longitudinally split shell, windows in the shell adjacent the split, an ear adjacent each window projecting from the shell at the split, a projection of the shell extending between the ears to close the split at the center of the shell, an extension projecting from the shell at the other edge of the split, screw holes through each ear and the extension, a screw passing through each hole, a nut on each screw having a gripping edge projecting through a window and engaging a pipe within the coupler, and a lip on the end of the extension and projecting at right angles thereto to engage the edge of each nut opposite to the gripping edge of the nut.

10. A pipe coupler comprising a cylindrical member having an open end to receive a pipe end, an opening in the cylindrical member, spaced screw supporting means projecting from the cylinder, the spaced means being positioned upon one side of the opening, a screw carried by the spaced screw supporting means, a nut on the screw having an edge projecting through the opening in the cylindrical member and contacting with the pipe to clamp it in the coupler, and attaching means for the coupler.

11. A pipe coupler comprising a longitudinally split cylindrical member, an opening in the cylindrical member, screw supporting means projecting from the cylindrical member on each side of the split, a screw carried by the screw supporting means, a nut on the screw having an edge projecting through the opening in the cylindrical member and contacting with the pipe to clamp it in the coupler, and attaching means for the coupler.

12. A pipe coupler comprising a longitudinally split cylindrical member, openings in the cylindrical member adjacent the split, members for each opening projecting from the cylindrical member on each side of the split, means to clamp the pipes through the openings, and a portion of the cylindrical member intermediate of its ends extending over the split in the member to close the split.

13. A pipe coupler comprising a member having an open end to receive the end of a pipe, an opening in the member, screw supporting means carried by the member upon one side of the opening with the other sides of the opening unobstructed, the screw supporting means extending substantially at right angles to the member, a screw carried by the screw supporting means with its threaded end unsupported, a nut on the screw having an edge projecting through the opening in the member and adapted to clamp a pipe within the member, and attaching means for the coupler.

In testimony whereof I affix my signature.

LEWIS H. CHURCH.

CERTIFICATE OF CORRECTION.

Patent No. 1,864,339.　　　　　　　　　　　　　　　　　June 21, 1932.

LEWIS H. CHURCH.

It is hereby certified that error appears in the printed specification of the above numbered patent requiring correction as follows: Page 2, line 4, after "windows" insert the word and; and that the said Letters Patent should be read with this correction therein that the same may conform to the record of the case in the Patent Office.

Signed and sealed this 11th day of October, A. D. 1932.

(Seal)

M. J. Moore,
Acting Commissioner of Patents.